United States Patent
Grice et al.

(10) Patent No.: US 11,411,724 B2
(45) Date of Patent: Aug. 9, 2022

(54) CONTINUOUS VARIABLE QUANTUM SECRET SHARING

(71) Applicant: UT-Battelle, LLC, Oak Ridge, TN (US)

(72) Inventors: Warren P. Grice, Oak Ridge, TN (US); Bing Qi, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 106 days.

(21) Appl. No.: 16/944,390

(22) Filed: Jul. 31, 2020

(65) Prior Publication Data
US 2021/0036846 A1 Feb. 4, 2021

Related U.S. Application Data

(60) Provisional application No. 62/881,407, filed on Aug. 1, 2019.

(51) Int. Cl.
*H04L 9/08* (2006.01)

(52) U.S. Cl.
CPC .................. *H04L 9/0858* (2013.01)

(58) Field of Classification Search
CPC ............................ H04L 9/0858; H04L 9/001
See application file for complete search history.

(56) References Cited

U.S. PATENT DOCUMENTS 7,457,416 B1 * 11/2008 Elliott ................... H04L 9/0852 380/256
7,515,716 B1 * 4/2009 Elliott ................... H04L 9/0858 380/256

(Continued)

FOREIGN PATENT DOCUMENTS

WO WO-2012044149 A1 * 4/2012 ............ H04B 10/70

OTHER PUBLICATIONS

WenChao et al.; "An integrated quantum secure communication system", Dec. 2011, Science China Press and Springer-Verlag Berlin Heidelberg, vol. 54 No. 12, pp. 2578-2591. (Year: 2011).*
Tyc et al.; "Efficient sharing of a continuous-variable quantum secret", Jun. 2003, Journal of Physics A: Mathematical and General, pp. 7625-7637. (Year: 2003).*
Assche et al.; "Reconciliation of a Quantum-Distributed Gaussian Key", Feb. 2004, IEEE Transactions on Information Theory, vol. 50, No. 2, pp. 394-400. (Year: 2004).*

(Continued)

*Primary Examiner* — Matthew Smithers
(74) *Attorney, Agent, or Firm* — Warner Norcross + Judd LLP

(57) ABSTRACT

Continuous variable quantum secret sharing (CV-QSS) technologies are described that use laser sources and homodyne detectors. Here, a Gaussian-modulated coherent state (GMCS) prepared by one device passes through secure stations of other devices sequentially on its way to a trusted device, and each of the other devices coherently adds a locally prepared, independent GMCS to the group of propagating GMCSs. Finally, the trusted device measures both the amplitude and the phase quadratures of the received group of coherent GMCSs using double homodyne detectors. The trusted device suitably uses the measurement results to establish a secure key for encoding secret messages to be broadcast to the other devices. The devices cooperatively estimate, based on signals corresponding to their respective Gaussian modulations, the trusted device's secure key, so that the cooperative devices can decode the broadcast secret messages with the secure key.

24 Claims, 7 Drawing Sheets

(56) References Cited

U.S. PATENT DOCUMENTS

| | | | |
|---|---|---|---|
| 7,706,535 B1* | 4/2010 | Pearson | H04L 9/0855 380/255 |
| 9,768,885 B2 | 9/2017 | Qi | |
| 9,866,379 B2* | 1/2018 | Nordholt | H04B 10/70 |
| 10,585,645 B2 | 3/2020 | Qi | |
| 2012/0195428 A1* | 8/2012 | Wellbrock | H04L 9/0858 380/255 |
| 2014/0233739 A1* | 8/2014 | Grice | H04L 9/0852 380/278 |
| 2015/0222619 A1* | 8/2015 | Hughes | H04L 9/0852 713/168 |
| 2018/0294961 A1* | 10/2018 | Wang | H04L 9/0852 |
| 2018/0351738 A1* | 12/2018 | Grice | H04L 9/0858 |
| 2019/0379463 A1* | 12/2019 | Shields | H04Q 11/0062 |
| 2020/0162248 A1 | 5/2020 | Qi et al. | |

OTHER PUBLICATIONS

Tyc, T. et al., "How to share a continuous-variable quantum secret by optical interferometry." Physical Review A, vol. 65, (2002): 042310, pp. 1-13.

Lau, H-K. et al., "Quantum secret sharing with continuous-variable cluster states." Physical Review A 88, No. 4 (2013): 042313, pp. 1-20.

Lance, A. et al., "Continuous variable (2, 3) threshold quantum secret sharing schemes." New Journal of Physics 5, (2003): pp. 1-13.

Schmid, C. et al., "Experimental Single Qubit Quantum Secret Sharing", Physical Review Letters, PRL 95, (2005) 230505, pp. 1-4.

Grice, W. et al., "Quantum secret sharing using weak coherent states", Physical Review A, 100 (2019), 022339, pp. 1-8.

* cited by examiner

CONTINUOUS VARIABLE QUANTUM SECRET SHARING

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF INVENTION

The present disclosure relates to the field of secret sharing, and more specifically to secret sharing based on forming and processing quantum signals that carry the secret. The following publication by the inventors is each hereby incorporated by reference in its entirety: *Quantum secret sharing using weak coherent states*, W. Grice and B. Qi, Physical Review A 100, 022339, published Aug. 28, 2019.

BACKGROUND

Quantum key distribution (QKD) has drawn attention for its proven security against adversaries with unlimited computing power. QKD is a secret key agreement primitive which can provide information-theoretic secure key for other cryptographic schemes (sometimes referred to as protocols). In QKD, two remote legitimate clients (typically referred to as Alice and Bob or transmitter and receiver) can establish a secure key by transmitting quantum states through an insecure channel controlled by an adversary (typically referred to as Eve or eavesdropper). The security of the key is based on features of quantum physics, rather than unproven assumptions regarding computationally difficult problems. QKD exploits quantum phenomena to enable secure communications that can only be compromised by violating known laws of physics. Accordingly, any attacks by Eve will, with a high probability, disturb the transmitted quantum state, and thus can be detected.

Quantum secret sharing (QSS) has also drawn attention for its security prospect based on fundamental laws of physics. QSS is a protocol that can allow a trusted party or device (described in some contexts as a dealer) to distribute a secret to a group of cooperative devices (described in some contexts as players), which can only access the secret cooperatively. As an example, the trusted device may distribute a secret message M to n cooperative devices in such a way that at least k≤n players have to work together to decode the message. This can be described as a (k,n)-threshold scheme. In cases where k=n, an (n,n)-threshold secret sharing protocol is used, where all of the n cooperative devices have to work together to decode the trusted device's message.

The security of QSS is related to QKD in that the key generation can be implemented with similar hardware and the underlying security level can be quantified based on the fundamental laws of physics. In contrast to a point-to-point two-party QKD protocol, the QSS protocol often involves more participants, with the potential that some are dishonest. This allows additional hacking strategies and can make the security analysis of a QSS protocol more demanding than that of the QKD protocol.

SUMMARY

In one embodiment, a system is provided for a nearly lossless modulation of a continuous variable (CV) optical field, which can facilitate CV QSS. QSS can be used in a multi-part quantum communication scheme in which a secret shared between many parties can facilitate QKD between any two of these parties.

In one embodiment, a system is provided in which multiple cooperative devices (e.g., players) are distributed along a single communication link that extends between the first cooperative device and a trusted device (e.g., dealer). Each cooperative device uses a local quantum-signal source to prepare a quantum signal having a randomly modulated amplitude and phase. Each cooperative device (except the first one) coherently combines quantum signals from one or more upstream cooperative devices with a locally prepared quantum signal, and sends the combination of quantum signals to a downstream cooperative device on its way to the trusted device. Note that the respective quantum signal prepared by each player carries a secret associated with the player.

In one embodiment, the trusted device measures the final quantum signal, which is a coherent combination of all the random signals from all cooperative devices. The measurement results along with portions of the secrets of the cooperative devices shared with the trusted device are used by the trusted device to establish a secret key. In turn, the secret key established by the trusted device can be determined by all the cooperative devices jointly (but not by any subsets of them) based on (i) decoding information broadcast by the trusted device, (ii) other portions of their own secrets, and (iii) corresponding portions of the secrets of the remaining devices. This allows cooperative devices and the trusted device to implement a secret sharing protocol that includes a quantum stage and a classical post-processing stage.

In general, one innovative aspect of the subject matter described herein can be embodied in a system for quantum secret sharing, the system comprising an optical link; a trusted device; a first device coupled with the trusted device through the optical link, the first device configured to form a first quantum signal that carries a first random signal, and launch the first quantum signal down the optical link to the trusted device; one or more intermediary devices distributed along the optical link between the first device and the trusted device, each intermediary device configured to form a respective quantum signal that carries an associated random signal, and launch its quantum signal down the optical link to the trusted device coherently with the quantum signals launched down the optical link by the first device and the intermediary devices disposed upstream from the intermediary device; wherein the trusted device is configured to receive a coherent combination of the quantum signals from the upstream devices and detect a combined random signal indicative of the random signals carried on the received quantum signals, for each upstream device, determine a respective key rate associated with the upstream device based on a randomly selected portion of the random signal obtained from the upstream device via authenticated communication, the corresponding portions of the random signals broadcast, by the respective remaining upstream devices, upon request by the trusted device, and the corresponding portion of the combined random signal, and produce, using reverse reconciliation from the remaining combined random signal, a secure key at a key rate equal to the minimum of the determined key rates, and broadcast, to the upstream devices, decoding information to be used by the upstream devices to collaboratively determine the secure key, and a message encoded using the secure key.

The foregoing and other embodiments can each optionally include one or more of the following features, alone or in combination. In particular, one embodiment includes all the following features in combination.

In some embodiments, the upstream devices are configured to collaborate with each other to determine the secure key by using the broadcast decoding information and by sharing unpublished portions of the random signals, and decode the broadcast message using the secure key.

In some embodiments, each intermediary device comprises a respective quantum-signal source configured to produce the associated quantum signal a respective combiner disposed in the optical link and configured to transmit the quantum signals launched down the optical link by the first device and the intermediary devices disposed upstream from the intermediary device, and receive, and redirect along the optical link, the locally produced quantum signal.

In some embodiments, the combiner comprises an asymmetric beam splitter with a transmissivity in a range of 50-99%, and a reflectivity in a range of 50-1%.

In some embodiments, each quantum-signal source comprises a laser module configured to emit pulsed-laser light, a signal generator configured to generate the respective random signal, a modulator configured to modulate the pulsed-laser light in accordance with the random signal, and an attenuator configured to reduce the power of the modulated pulsed-laser light to form the quantum signal.

In some embodiments, the laser module comprises a solid-state laser with an emission spectrum in one of the O-band, the C-band, the L-band, the S-band, or the E-band.

In some embodiments, the signal generator is configured to generate the random signal in accordance with a random-number distribution having a zero-mean Gaussian envelope.

In some embodiments, each upstream device further comprises a respective transducer, and the quantum-signal source comprises a thermal source configured to emit a random optical signal, and a source beam splitter configured to transmit a fraction of the random optical signal as the quantum signal, and reflect the remaining random optical signal to the transducer, wherein the transducer is configured to convert the reflected portion of the random optical signal to the random signal.

In some embodiments, the thermal source comprises a super-luminescent diode.

In some embodiments, wherein the transducer comprises a homodyne detector.

In some embodiments, the trusted device is configured to calibrate transmissions of the combiners by collaborating with the upstream devices.

In some embodiments, the trusted device is configured to determine, for each upstream device, the respective key rate associated with the upstream device using security proof of two-party quantum-key distribution between the upstream device and the trusted device.

In some embodiments, the trusted device comprises a homodyne detector.

In some embodiments, the trusted device is configured to, for each upstream device, obtain, from the upstream device via authenticated communication, a randomly selected portion of the random signal, access the corresponding portions of the random signals broadcast, upon request by the trusted device, by the respective remaining upstream devices, and determine a respective key rate associated with the upstream device based on the corresponding portions of the random signals and of the combined random signal.

In some embodiments, each intermediary device is configured to launch its quantum signal down the optical link in the same spatiotemporal mode as the quantum signals launched down the optical link by the first device and the intermediary devices disposed upstream from the intermediary device.

In some embodiments, wherein the optical link comprises one of a fiber optic or free space.

In some embodiments, the one or more intermediary devices distributed along the optical link between the first device and the trusted device comprise up to one hundred intermediary devices.

In general, one innovative aspect of the subject matter described herein as a system for quantum secret sharing, the system comprising: an optical link; a trusted device; a first device coupled with the trusted device through the optical link, the first device configured to: form a first quantum signal that carries a first random signal, and inject the first quantum signal into the optical link; a second device disposed along the optical link between the first device and the trusted device, the second device configured to: form a second quantum signal that carries a second random signal, and inject the second quantum signal into the optical link coherently with the first quantum signal; wherein the trusted device is configured to: receive a coherent combination of the first and second quantum signals of the first and second devices, detect a combined random signal indicative of the first and second random signals carried on the first and second quantum signals, produce a secure key based, at least in part, on the combined random signal, transmit, to the first and second devices, information to be used by the first and second devices to collaboratively determine the secure key.

The foregoing and other embodiments can each optionally include one or more of the following features, alone or in combination. In particular, one embodiment includes all the following features in combination.

In some embodiments, the trusted device, for each of the first and second devices, determines first and second key rates associated respectively with the first and second devices; the first key rate is based on 1) a first randomly selected portion of the first random signal obtained from the first device via authenticated communication, 2) a first key rate corresponding portion of the second random signal broadcast by the second device, and 3) a first key rate corresponding portion of the combined random signal; and the second key rate is based on 1) a second randomly selected portion of the second random signal obtained from the second device via authenticated communication, 2) a second key rate corresponding portions of the first rate random signals broadcast by one the first device, and 3) a second key rate corresponding portion of the combined random signal.

In some embodiments, the trusted device is configured to produce, using reverse reconciliation from a portion of the combined random signal other than the first and second key rate corresponding portions, the secure key at a key rate equal to a minimum of the determined first and second key rates.

In some embodiments, the trusted device is configured to transmit, to the first and second devices, a message encoded using the secure key, and wherein the first and second devices are operable to decode the message using the secure key.

In some embodiments, the first and second devices are configured to determine the secure key by using the information transmitted from the trusted device and by sharing unpublished portions of the random signals.

In some embodiments, the optical link comprises one of a fiber optic or free space.

In some embodiments, the second device includes a second device combiner optically coupled with the optical link, the second device is operable to maintain a phase reference of the first quantum signal, and use the second device combiner to coherently combine the locally formed second quantum signal with the first quantum signal that is incoming down the optical link to yield an outgoing coherent combination of first and second quantum signals based at least on the phase reference.

In some embodiments, the system comprises a plurality of devices including the first and second devices, and wherein: each of the plurality of devices is coupled with the trusted device through the optical link; each of the plurality of devices is configured to form a respective quantum signal, access a phase reference that is shared among the plurality of devices, and inject, in accordance with the shared phase reference, the locally formed quantum signal into the optical link; each of the respective quantum signals carries an associated random signal respectively provided by each of the plurality of devices the coherent combination received by the trusted device includes the respective quantum signal from each of the plurality of devices; and the combined random signal is indicative of the associated random signal respectively provided by each of the plurality of devices.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DETAILED DESCRIPTION

Figure 1:
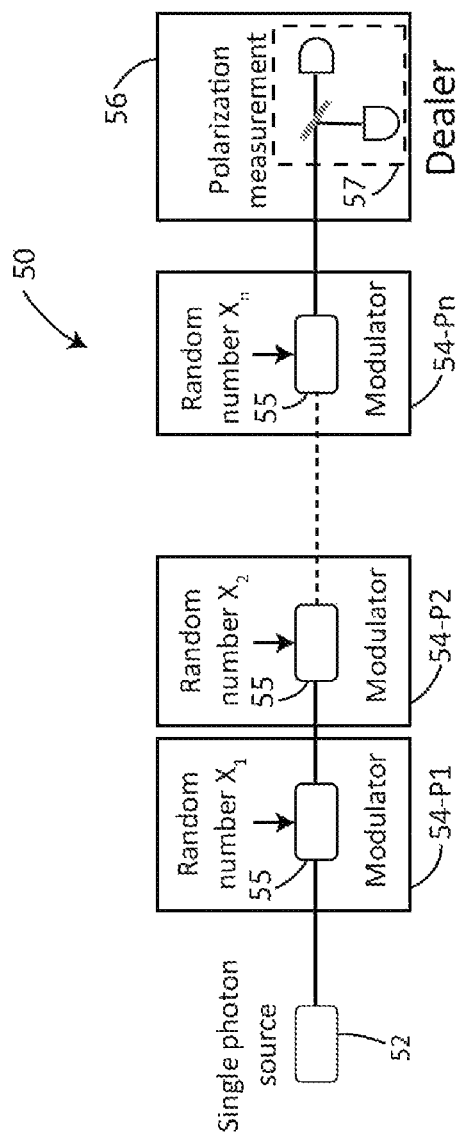
FIG. 1 illustrates a system for quantum secret sharing in accordance with one embodiment.

A quantum secret sharing system and method in accordance with one embodiment are provided. The system and method may be operable to generate a first local random quantum signal, store first random number associated with the first local random quantum signal, and to receive a first incoming random quantum signal. The system and method may involve coherently combining the first local random quantum signal and the first incoming random quantum signal to yield a first outgoing random quantum signal. Second random number may be obtained by detecting the first outgoing random quantum signal, and a shared key may be established based on the first and second random numbers once the information about the first incoming random quantum signal is publicly announced.

The system may be implemented in a cooperative device, which is part of a system of cooperative devices and a trusted device. The second random number may be obtained from another cooperative device. The shared key that is based on the outgoing random quantum signal may be determined in the trusted device, where the shared key is based on the coherent combination of the local random quantum signals generated in each of the cooperative devices.

Secret sharing allows a trusted party or trusted device to distribute a secret to a group of players or devices, who can only access the secret cooperatively. Quantum secret sharing (QSS) protocols may provide unconditional security based on fundamental laws in physics. In one embodiment, a continuous variable QSS protocol is provided using laser sources and homodyne detectors. In this protocol, a Gaussian-modulated coherent state (GMCS) prepared by one device may pass through the secure stations of the other devices sequentially, and each of the other devices may inject a locally prepared, independent GMCS into the circulating optical mode. Finally, the trusted device may measure both the amplitude and the phase quadratures of the received optical mode using double homodyne detectors. The trusted device suitably uses the measurement results to establish a secure key for encoding secret messages to be broadcast to the other devices. Collectively, the devices can use signals corresponding to their Gaussian modulations to estimate the trusted device's secure key, so that the cooperative devices can use the estimated secure key to decode the broadcast secret messages. Unconditional security of the protocol described herein may be provided against both eavesdroppers and dishonest players in the presence of high channel loss.

I. Overview

In QKD, two parties or devices may be able to generate identical strings of random bits at two locations via quantum states of light. Any attempts by an adversary to read the information is revealed in detectable changes to the quantum states with high probability. Unlike most conventional methods for secure key distribution, the security of QKD is rooted in the laws of physics, instead of current computational limits. Thus, QKD-based techniques will remain secure, even with inevitable advances in computational power. QSS is a related technique that involves more than two parties or devices.

QSS can be accomplished in a variety of ways in accordance with the present disclosure. In multi-qubit QSS, an N-qubit entangled state is distributed to N different receivers. Each receiver may subsequently perform a measurement on its qubit in a randomly chosen measurement basis. The receivers may publicly reveal their measurement basis choices, but not their measurement results. In a certain subset of cases, the measurement results may be correlated such that any N−1 receivers will be able to collectively determine the measurement result of the remaining receiver.

In one embodiment, a single-qubit QSS system is provided that operates in a manner similar to multi-qubit QSS, except that only a single quantum state is needed, and the roles of the participants may be different. One device may prepare single quantum states in randomly chosen states, one device may receive and measure the quantum states, and multiple devices may perform randomly chosen operations on the quantum state as it travels from source to receiver. Just as is the case for multi-qubit QSS, the devices may share correlated information in a certain subset of cases. In those cases, N−1 devices may be able to collectively determine the information held by the remaining device.

CV-QSS, in one embodiment, may be accomplished by adding intermediate devices to a CV-QKD system, with each intermediate party modulating the amplitude and phase of the CV state as it passes by.

For instance, a system described herein in accordance with one embodiment may be configured to make it possible for an intermediate CV-QSS device to introduce arbitrary amplitude and phase displacements to an incoming CV state in the whole phase space, resulting in an effective amplitude and phase modulation with no reduction in amplitude on average, as required by a CV-QSS protocol. Furthermore, this scheme can be implemented with commercial off-the-shelf components, which makes it highly practical. Each intermediate node or device may include a strong source of Gaussian modulated light, along with a combiner for mixing the incoming CV state with a small fraction of the strong Gaussian beam. The Gaussian modulated light can be prepared actively by using a laser source followed by amplitude and phase modulators, or passively by using a thermal source. This mixing may be accomplished by having both fields incident on a highly asymmetric beam splitter that is highly transmissive and very weakly reflective. By itself, the incoming CV state would pass through the beam splitter with almost no change in its state. If the strong beam is incident on the other input port, a small portion may be reflected in the same direction as the transmitted CV state. The distributions of the amplitude and phase of the strong beam and/or the reflectivity can be chosen according to the QSS protocol to achieve a target level performance, which may be an optimal level of performance. The output state may be the coherent superposition of the weakly reflected state and the transmitted CV state. In the limit of unit transmissivity, the incident state may experience no loss and the output state is the coherent sum of the weakly reflected state and the incident CV state. If the state of the strong Gaussian beam is known (by the intermediate device), then the effective modulation can be readily determined. This may be accomplished by modulating an initial strong beam (active scheme) or by measuring the state of the transmitted portion of the strong Gaussian beam (passive scheme). Besides enabling QSS for CV states, this approach has the advantage that it is relatively immune to Trojan Horse attacks in which an adversary attempts to probe a quantum modulation device by interrogating it with a strong optical field (often in a slightly different spectral or temporal band). Because the CV QSS system is almost completely transparent to the incident state, very little information could be gleaned from a Trojan Horse attack.

In one embodiment, a system is configured to provide a (n,n) threshold secret sharing, in which a trusted device distributes a secret message M to n devices ($P_1, P_2, \ldots, P_n$). All of the n devices may be required to work together to decode the message M (any subsets of the devices cannot gain information on M). Secret sharing can be implemented if the trusted device holds a secure key K (a long train of random numbers) which can be determined by the n devices together (but not by any subsets of them). The trusted device can use K to encrypt message M and distribute the encrypted message to the devices.

A QSS protocol may allow the trusted device to establish the secure key K with the n devices. One approach may involve providing a single photon from a source that propagates from device to device sequentially. Each device may independently apply a random polarization rotation (using a modulator) on the same photon. Finally, the last recipient or trusted device (e.g., dealer) may perform a polarization measurement. The measurement results of the trusted device can be determined by all the devices jointly (but not by any subsets of them). This allows the trusted device to generate a secure key K for secure sharing. However, there is an opportunity in this approach to conduct a Trojan-horse attack in which an adversary may send faked signals to the modulators held by the devices and read out the encoded random number $X_i$. One embodiment in accordance with the present disclosure may include a system that enables a QSS protocol that is substantially immune to such types of Trojan-horse attacks.

Secret sharing is a cryptographic primitive with practical applications. In a secret sharing protocol, a trusted device may distribute a secret message M to n devices, which may be cooperative devices, in such a way that at least k≤n players have to work together to decode the message. This is called a (k,n)-threshold scheme. For purposes of disclosure, one or more systems and methods described herein focus on the (n,n)-threshold secret sharing protocol, which means all the n devices have to work together to decode the dealer's message. However, the present disclosure is not so limited. For instance, the systems and methods described herein may be used in conjunction with a (k,n)-threshold scheme.

In one embodiment, if the trusted device shares an independent secure key $K_i$ (i=1, 2, . . . , n) with each cooperative device and the length of each key is the same as that of the message, then a (n,n)-threshold scheme can be implemented as follows. The trusted device may first generate a new key $K=K_1 \oplus K_2 \oplus \ldots \oplus K_n$ where "$\oplus$" denotes addition modulo 2, then encodes message M using K and broadcasts the encrypted message $E=M \oplus K$. In this configuration, only when the n cooperative devices work together can they determine K and thus decode M from E.

The security of one embodiment in accordance with the present disclosure may rely on the security of each individual key. In a two-party quantum key distribution (QKD) protocol, a system can be employed to generate unconditional secure keys through insecure channels. The trusted device may establish a QKD link with each of the cooperative devices and generate n individual keys before running the secure sharing protocol. However, such an implementation is considered rather inefficient for large n.

The security of QSS can be considered associated with that of QKD. Nevertheless, in contrast to a point-to-point two-party QKD protocol, a QSS protocol may often involve more participants and some of them might be dishonest. As described herein, this may allow additional hacking strategies and can make the security analysis of a QSS protocol more demanding than that of QKD.

CV QKD techniques were conventionally used to analyze CV-QSS security and substantially protect against the hacking strategies described herein, such as both dishonest participants and eavesdroppers in the channels. The foregoing conventional CV-QSS protocol is based on multiparty quantum entanglement, with tolerable channel losses that are quite small. In contrast to the forgoing conventional techniques, the CV-QSS techniques described herein do not require quantum entanglement and can tolerate high channel losses.

A system that operates according to a single qubit sequential QSS protocol is shown in FIG. 1 and generally designated 50. The system 50 includes a single photon source 52 operable to prepare a single photon in an initial polarization state, where the single photon propagates from device to device 54-P1, 54-P2, 54-PN (e.g., party to party or P1, P2 . . . PN) sequentially. Each device 54-P1, 54-P2, 54-PN independently applies a random BB84-type polarization rotation on the same photon via a polarization rotation device 55. Note that BB84 is a quantum-key distribution scheme developed by Charles Bennet and Gilles Brassard in 1984. The last recipient, a trusted device 56, performs a polarization measurement via detector 57. In half of the cases, the combination of the basis choices by all the devices 54-P1, 54-P2, 54-PN results in a deterministic measurement result at the trusted device 56. These instances may be used to implement secret sharing when equipped with a post-processing procedure.

While the system 50 can significantly improve the feasibility of QSS, the security of the system 50 is considered suspect. For instance, the system 50 may be vulnerable to Trojan horse attacks where a malicious eavesdropper could send in multiphoton signals to the polarization rotation device 55 of the targeted device and unambiguously determine the corresponding polarization rotation by measuring the output signals. In the context of QKD systems, a similar issue has been investigated in the so-called "plug-and-play" design, where Bob sends a strong unmodulated laser pulse to Alice through an insecure channel, who in turn encodes information and sends it back to Bob after attenuating it to the single-photon level. Since the laser pulses from Bob to Alice are strong classical signals, the security issue due to the bidirectional feature of Alice's system could be mitigated by characterizing the light pulses received by Alice using conventional photodetectors. However, it is more difficult to apply the same countermeasures in the case of single qubit sequential QSS, where the attacker can use a weaker probe signal. This is not only because the system 50 does not employ an attenuator (as in the plug-and-play design) but also because the attacker can make use of both ports of the device 54-P1, 54-P2, 54-PN rather than probing and detecting via a single port.

Figure 2A:
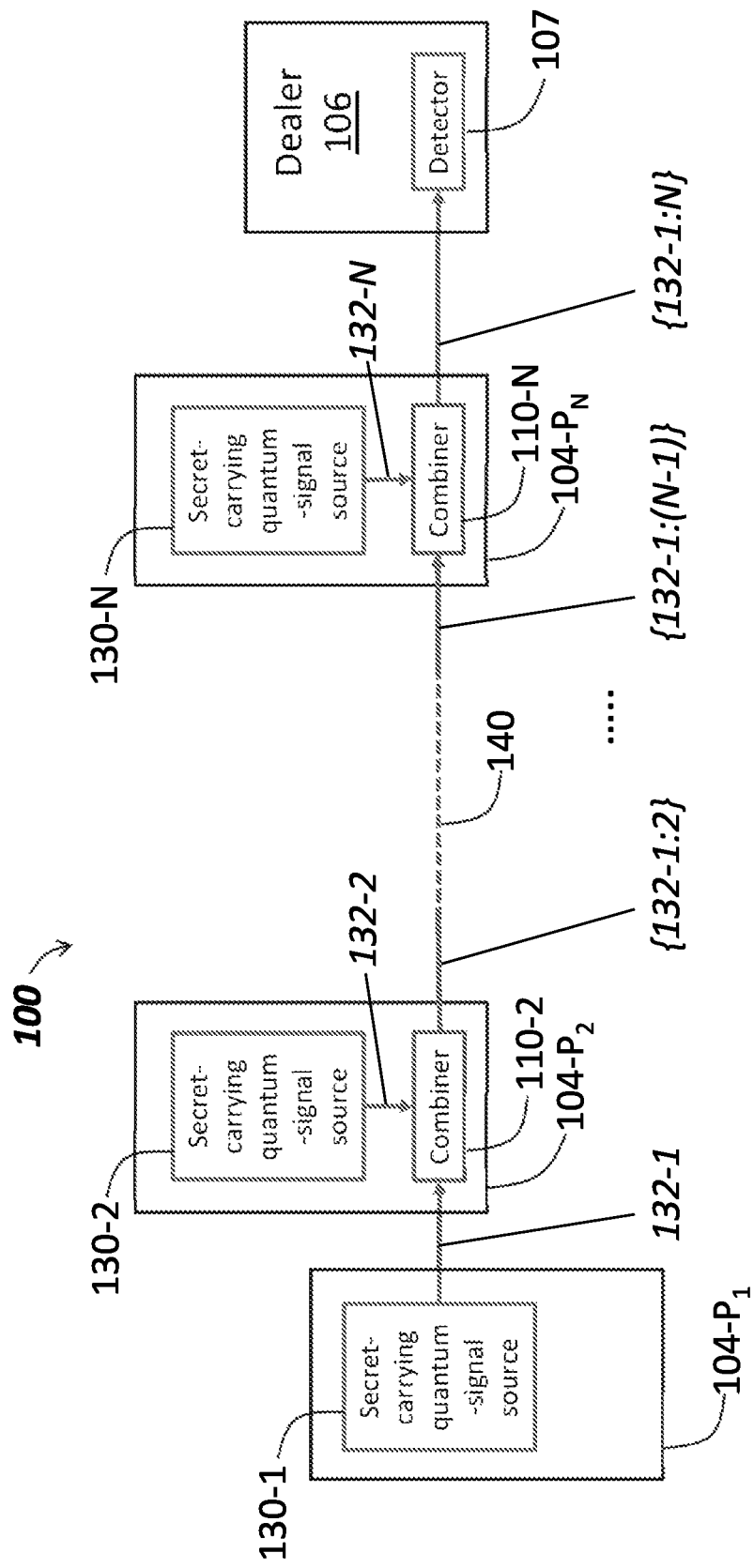
FIG. 2A illustrates a system for quantum secret sharing in accordance with one embodiment.

A system 100 in accordance with one embodiment, shown in FIG. 2A, may be operable to mitigate the vulnerabilities of the system 50. The system 100 may implement a CV sequential QSS protocol based on laser sources and homodyne detectors. The system 100 may be configured such that, instead of modulating the quantum state of a "passing through" photon, each device 104 may inject a locally prepared quantum state into a circulating optical mode using a combiner 110 (e.g., a beam splitter). This configuration may substantially prevent an eavesdropper from accessing or interfering with the quantum state preparation process and makes the system 100 substantially resilient to Trojan horse attacks. By choosing an appropriate beam splitting ratio, the additional loss introduced by each intermediate device 104-P2, . . . , 104-PN can be extremely small, making the protocol extendable to a large number of devices 104. Furthermore, the general security of the protocol implemented by the system 100 substantially protects against both eavesdroppers and dishonest players in the presence of high channel loss.

II. QSS System

The system 100 in the illustrated embodiment of FIG. 2A, as described herein, includes an optical link 140, a trusted device 106, a first device 104-P1 coupled with the trusted device 106 through the optical link 140, and a plurality of intermediary devices including a second device 104-P2, . . . , and an $N^{th}$ device 104-PN distributed along the optical link 140 between the first device 104-P1 and the trusted device 106. The first device 104-P1 is configured to form a first quantum signal 132-1, and launch it down the optical link 140 to the trusted device 106. Each intermediary device 104-Pj includes a combiner 110-j operable to coherently combine a locally-formed quantum signal 132-j with an incoming coherent combination of upstream-formed quantum signals {132-1, 132-2, . . . , 132-(j−1)} to yield an outgoing coherent combination of quantum signals {132-1, 132-2, . . . , 132-(j−1), 132-j}, where 2≤j≤N. Note that in the figures used to illustrate the disclosed technologies, the notation {132-1:j} is used to denote a coherent combination of "j" quantum signals {132-1, 132-2, . . . , 132-j}. Here, each intermediary device 104-Pj is configured to form a respective quantum signal 132-j, and launch its quantum signal 132-j down the optical link 140 to the trusted device 106 coherently with the quantum signals {132-1:(j−1)} launched down the optical link 140 by the first device 104-P1 and the intermediary devices 104-P2, . . . , 104-P(j−1) disposed upstream from the intermediary device 104-Pj.

In the illustrated embodiment, each device 104-Pj includes a respective quantum-signal source 130-j, where 1≤j≤N. Each quantum-signal source 130-j is configured to produce a respective quantum signal 132-j, which in turn carries an associated random signal S-j. The random signal S-j={$x_j,p_j$} includes a signal $x_j$ indicative of an amplitude modulation of the quantum signal 132-j, and another signal $p_j$ indicative of a phase modulation of the quantum signal 132-j. In some implementations, the modulation signals $x_j$ and $p_j$ are sequences of independent random numbers, for instance. Each device 104-Pj is operable to locally store, prior to launching the locally formed quantum signal 132-j down the optical link 140 to the trusted device 106, a copy of the random signal S-j that rides on the quantum signal 132-j. Note that the devices 104-P1, . . . , 104-PN can be referred to as "players" and the trusted device 106 as "dealer," while the random signal S-j can be referred to as the secret signal, or simply the secret, associated with the device 104-Pj. The optical link 140 is a single communication channel and can be implemented as a telecom fiber, or as free space.

As described herein, in one embodiment, each device 104-Pj is operable to cooperatively determine a secure key based on (i) decoding information received from the trusted device 106, (ii) portions of its own stored random signal S-j, and (iii) portions of random signals S-k≠j stored by, and shared with, the other devices 104-Pk≠j. The secure key, determined by the devices 104-Pj, where 1≤j≤N, corresponds to a secure key K established by the trusted device 106, as described below in connection with FIG. 2B, based on (i) measurements of the coherent combination of quantum signals {132-1:N} received by the trusted device 106 from the upstream devices 104-P1, . . . , 104-PN, and (ii) other portions of the random signals S-j stored by the upstream devices 104-P1, . . . , 104-PN.

The trusted device 106 is operable to receive the coherent combination of the quantum signals {132-1:N} launched down the optical link 140 by the upstream devices 104-P1, . . . , 104-PN. The trusted device 106 includes a detector 107 operable to detect a combined random signal S-D indicative of the random signals S-1, ..., S-N. The combined random signal S-D={$x_D,p_D$} includes a signal $x_D$ of measurements of an amplitude modulation of the coherent combination of the quantum signals {132-1:N}, and another signal PD of measurements of a phase modulation of the coherent combination of the quantum signals {132-1:N}. As described below in connection with FIG. 2B, the trusted device 106 is operable to establish a secure key based on (i) the detected combined random signal S-D, and (ii) portions of the random signals S-j stored, and shared with the trusted device 106, by the upstream devices 104-P1, ..., 104-PN.

In the system 100, in one embodiment, the coherent combination of the quantum signals {132-1:N} received by the trusted device 106 from the devices 104-P1, ..., 104-PN is a sequential, coherent combination of a Gaussian-modulated coherent-state (GMCS). Here, the random signals S-1, ..., S-N carried by the respective quantum signals 132-1, ..., 132-N include sequences of random numbers having Gaussian envelopes.

In one embodiment of system 100 shown in FIG. 2A, N devices 104 and a trusted device 106 are connected by an optical link 140. For each quantum transmission, the first device 104-P1 at one end of the link 140 prepares a first quantum signal 132-1 as a GMCS $|x_1+ip_1\rangle$ and sends it downstream along the optical link 140 to the adjacent device 104-P2. Here $x_1$ and $p_1$ are independent Gaussian random numbers with zero mean and a variance of $V_1N_0$, where $V_1$ is the modulation variance chosen by device 104-P1, and $N_0=\frac{1}{4}$ denotes the shot-noise variance. The above coherent state passes through the combiner 110-2 of the device 104-P2, which may be a highly asymmetric beam splitter (with a transmittance $t_B\cong 1$) located within the secure station of device 104-P2. The coherent state continues its journey to the next device 104-P3, not shown in FIG. 2A. In the meantime, device 104-P2 locally prepares a second quantum signal 132-2 as an independent GMCS and couples it into the same spatiotemporal mode as the first quantum signal 132-1 from device 104-P1 via the combiner 110-2. By controlling the modulation variances and having knowledge of the reflectivity of the asymmetric beam splitter of the combiner 110-2, the device 104-P2 can coherently combine the phase-space displacements of the second GMCS {$x_2,p_2$} with the phase-space displacements of the first GMCS {$x_1, p_1$}. All the other devices 104 may perform similar operations. At the end, the quantum state {132-1:N} that arrives at the trusted device 106 can be described by $|\Sigma_{k=1}^n \sqrt{T_k}x_k + i\Sigma_{k=1}^n\sqrt{T_k}p_k\rangle$ where $T_k$ is the overall transmittance, including losses due to the channel 140 and the beam splitters 110-(k+1), ..., 110-N, experienced by the quantum signal 132-k from the kth device 104-Pk. The detector 107 of the trusted device 106 is configured to measure both the amplitude and the phase quadratures of the received optical mode {132-1:N} by performing double homodyne detection, for instance. If all the devices 104 collaborate with each other and share portions of locally saved copies of the encoded Gaussian random numbers, they can acquire a good estimation of the measurement results of the trusted device 106. The foregoing operations allows the trusted device 106 to generate a secure key which can only be known by the whole group of n devices 104 and not by any subset of them. In this manner, the trusted device 106 can use the above secure key to implement an (n,n)-threshold secret sharing protocol.

Figure 2B:
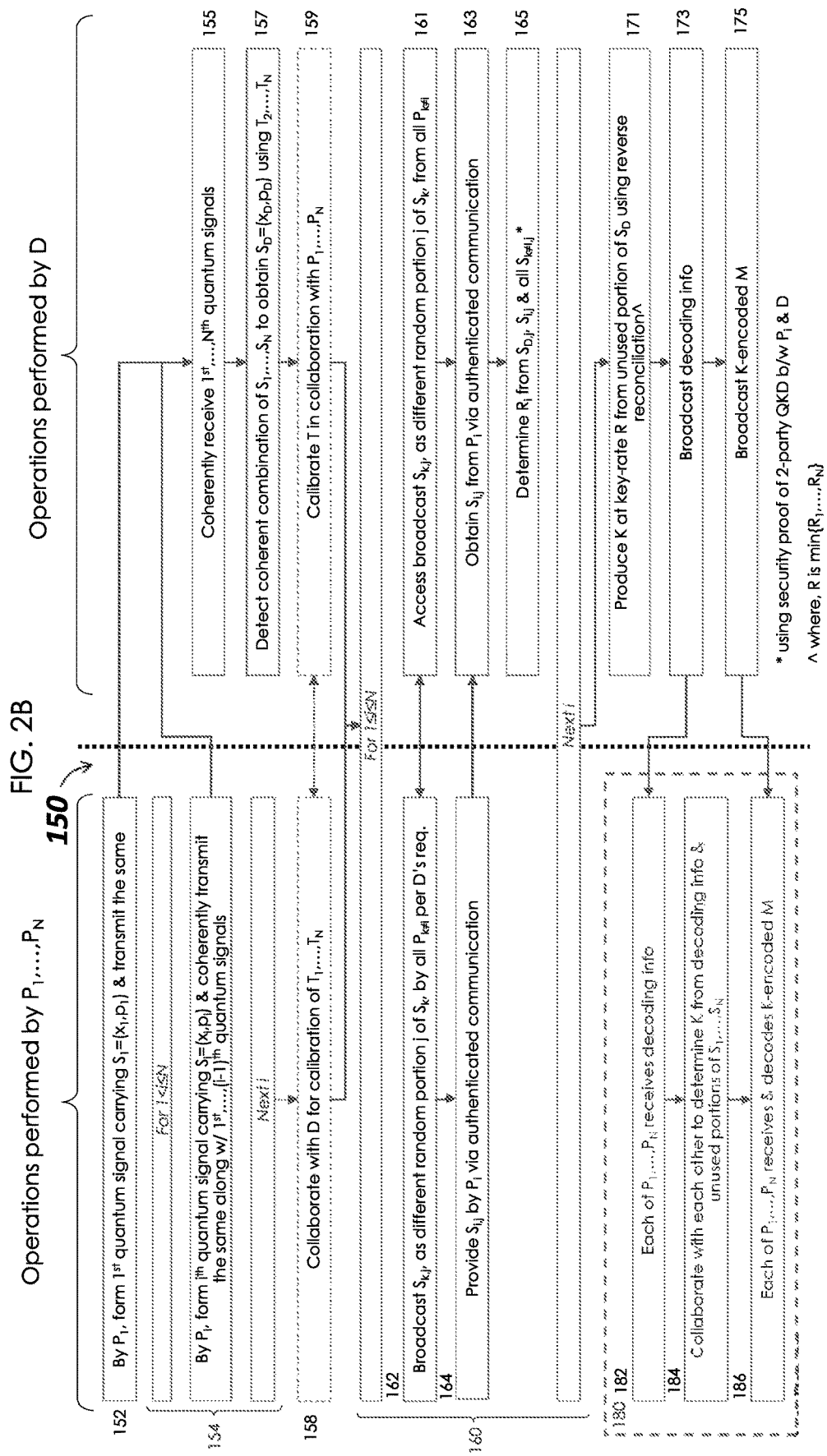
FIG. 2B illustrates a method for quantum secret sharing in accordance with one embodiment.

FIG. 2B shows a flowchart of a method 150 in accordance with one embodiment for performing a QSS protocol that involves a quantum stage and a classical post-processing stage. The method 150 can be performed by the devices 104 and 106 of the system 100, for instance, and will be described below with reference to system 100.

The quantum stage includes at least some of steps 152-157.

At 152, the first device 104-P1 forms a first quantum signal 132-1 that carries a first random signal S-1={x1,p1}. Further, the first device 104-P1 launches the first quantum signal 132-1 down the optical link 140 to the trusted device 106. For instance, the first device 104-P1 may draw a pair of Gaussian random numbers {$x_1, p_1$}, prepare a coherent state $|x_1+ip_1\rangle$, and send it downstream to an adjacent device 104 on its way to the trusted device 106.

At loop 154, each intermediary device 104-Pi, where $2\leq i\leq N$, form a respective quantum signal 132-i that carries an associated random signal S-i={xi,pi}. Further, the device 104-Pi launches its quantum signal 132-i down the optical link 140 to the trusted device 106 coherently with the quantum signals 132-j launched down the optical link 140 by the first device 104-P1 and the intermediary devices 104-Pj disposed upstream from the intermediary device 104-Pi, where $1\leq j\leq(i-1)$. For instance, using a highly asymmetric beam splitter, each device 104-Pi down the link 140 may inject a locally prepared GMCS into the same spatiotemporal mode as the signal from the device 104-P1.

At 155, the trusted device 106 receives a coherent combination of the quantum signals {132-1:N} from the upstream devices 104-P1, ..., 104-PN.

At 157, the trusted device 106 uses the detector 107 to detect a combined random signal S-D={$x_d,p_d$} indicative of the random signals S-1, ..., S-N carried on the received quantum signals 132-1, ..., 132-N. For instance, the trusted device 106 may measure the amplitude and phase quadratures of the received optical mode by performing double homodyne detection. The measurement results {$x_d, p_d$} may be kept as raw data. The steps 152-157 may be repeated many times to generate enough raw data.

The classical post-processing stage includes at least some of the steps 158-186. Optionally, at 158-159, the trusted device 106 works in collaboration with the devices 104-P1, ..., 104-PN to calibrate channel transmittance {$T_1$, $T_2$, ..., $T_N$}. For instance, the trusted device 106 may randomly select a subset of the raw data and requests all the devices 104-P1, ..., 104-PN to announce the corresponding Gaussian random numbers. Combined with the corresponding measurement results, the channel transmittance {$T_1, T_2, ..., T_N$} can be determined. All the devices 104 and the trusted device 106 may discard the disclosed data. Other methods can be used by the trusted device 106 in collaboration with the devices 104-P1, ..., 104-PN to calibrate channel transmittance {$T_1, T_2, ..., T_N$}, for instance, by transmitting strong laser pulses.

At loop 160, for each upstream device 104-Pi, where $1\leq i\leq N$, the trusted device 106 determines, at 165, a respective key rate Ri associated with the upstream device 104-Pi, based on (i) a randomly selected portion S-i,j of the random signal S-i obtained from the upstream device 104-Pi via authenticated communication, at 163 & 164; (ii) the corresponding portions S-k≠i,j of the random signals S-k≠i broadcast, by the respective remaining upstream devices 104-Pk≠i, where $1\leq k\leq N$, upon request by the trusted device 106, at 161 & 162, and (iii) the corresponding portion S-D,j of the combined random signal S-D detected at 157. In some implementations, the trusted device 106 determines, for each upstream device 104-Pi, the respective key rate Ri associated with the upstream device 104-Pi using security proof of two-party quantum-key distribution (QKD) between the upstream device 104-Pi and the trusted device 106.

For instance, the trusted device 106 may assume that device 104-P1 is honest and all the other devices 104-P2, ..., 104-PN are dishonest. here, the trusted device 106 may randomly select a subset of remaining raw data and request all the devices 104-P2, ..., 104-PN except device 104-P1 to announce their corresponding raw data. Further here, the trusted device 106 may displace the measurement results of the subset in the previous step using $x_R = x_d - \Sigma_{k=2}^{n} \sqrt{T_k} x_k$; $p_R = p_d - \Sigma_{k=2}^{n} \sqrt{T_k} p_k$. From $\{x_R, p_R\}$ and device 104-P1's raw data for the same subset, the trusted device 106 and the device 104-P1 estimate a lower bound of secure key rate $R_1$ (in unit of bits per pulse) of two-party QKD following the post-processing procedures in the GMCS QKD. All the parties may discard the disclosed data. The foregoing steps are repeated for the remaining devices 104-P2, ..., 104-PN. In each iteration of loop 160, a different device 104-Pi is selected as the honest player. At the end, the trusted device 106 has determined n secure key rates $\{R_1, R_2, \ldots, R_n\}$.

At 171, the trusted device 106 determines the secure key rate R of the QSS protocol as the minimum of $\{R_1, R_2, \ldots, R_n\}$, and produces the final secure key K, at the key rate R, from undisclosed data (i.e., the remaining combined random signal S-D) using the reverse reconciliation scheme developed in GMCS QKD.

At 173, the trusted device 106 broadcasts decoding information to be used by the upstream devices 104-P1, ..., 104-PN to collaboratively determine the secure key K. Note that, in reverse reconciliation, classical information goes from the trusted device 106 to the devices 104-P1, ..., 104-PN. Accordingly, this process can be accomplished without the cooperation of the players 104-P1, ..., 104-PN.

At 175, the trusted device 106 can implement a QSS protocol by using the final secure key K to encrypt a message M to be broadcast.

At block 180, the upstream devices 104-P1, ..., 104-PN collaborate with each other to determine, at 184, the secure key K by using the broadcast decoding information, received at 182, and by sharing unpublished random signals. Then, at 186, the upstream devices 104-P1, ..., 104-PN can decode the broadcast message M using the secure key K. For instance, collaboratively, the n devices 104 can recover the final secure key K, and thus the message M from the trusted device 106, using their Gaussian random numbers and the classical information announced by the trusted device 106. Any group of n-1 (or fewer) devices 104 can only gain an exponentially small amount of information about the final secure key.

The data reconciliation procedure noted above may be similar or the same as that implemented for GMCS QKD. It is to be understood that, in the above protocol 150, there is an implicit assumption that all the parties share a phase reference. Establishing such a phase reference is described below.

The security analysis of a QSS protocol is often more involved than that of QKD. The general security proof against both eavesdroppers in the channels and dishonest players is also described below.

In one embodiment, a security proof strategy may be established by connecting the security of QSS with that of the underlying two-party QKD. In the CV-QSS protocol in accordance with one embodiment of the present disclosure, the trusted device 106 needs to generate a secure key from the measurement results using reverse reconciliation. The rate at which the secure key can be generated (the lower bound of the secure key rate) may be determined such that only when all the n devices 104 work together can they recover the trusted device's 106 secure key, while any group of n-1 (or fewer) players can only gain an exponentially small amount of information. The rate determination can be connected to QKD as follows: Consider that the trusted device 106 requests a group of n-1 devices 104 to publicly announce their Gaussian random numbers while the last device 104 (Alice) keeps her data private. In this case Alice (who holds the complete information of the n devices 104) should be able to recover the secure key while the n-1 players do not have sufficient information for key recovery. This is equivalent to a two-party QKD problem where two honest users (Alice and the trusted device 106) try to generate a secure key against all the other n-1 devices 104 (and potential eavesdroppers in the channel). So the secure key rate of QSS may be determined as the same as that of QKD and can be calculated using security proofs for QKD. Since Alice is assumed to be honest in the above picture, it is reasonable to assume the device 104 associated with or controlled by her is also trusted. This indicates that the standard security proof for QKD with trusted transmitter and receiver may be used to evaluate the secure key rate. Since the secure key of QSS should be secure against any group of n-1 devices 104, the trusted device 106, in one embodiment, needs to repeat the above procedure n times: the trusted device 106 evaluates potential secure key rates of QKD with each individual device 104 (by assuming all the other devices 104 are dishonest) and chooses the smallest one among them as the secure key rate for QSS (loop 160 of method 150). This substantially guarantees the security against the collaborating attacks between the eavesdropper and any n-1 (or fewer) devices 104. By employing the security proof of QKD, a highly efficient, loss-tolerant QSS can be achieved.

In one embodiment, the secure key rate of QKD between the trusted device 106 and a chosen device 104 may be evaluated given that all the other n-1 devices 104 are dishonest. As a secure argument, as specified in steps 161-164 of method 150, after the trusted device 106 has decided which device 104 to conduct QKD with, that device 104 requests all the other devices 104 to announce encoded random numbers for a randomly chosen subset of the raw data. The trusted device 106 then displaces the corresponding measurement results using $x_R = x_d - \Sigma_{k=2}^{n} \sqrt{T_k} x_k$; $p_R = p_d - \Sigma_{k=2}^{n} \sqrt{T_k} p_k$ and estimates a lower bound for the QKD key rate with the device 104 chosen above. Since the displacement operation commutes with homodyne detection, instead of displacing the measurement results, the trusted device 106 may perform phase-space displacements before double homodyne detection. This virtual displacement operation may be assumed to performed by the n-1 devices 104 outside the trusted device's 106 secure station without weakening the security of the protocol. In this picture, the actual protocol may be reduced to the QKD where all the operations by the other n-1 devices 104 (and potential eavesdroppers) are conducted in the channel or link 140 before the two QKD devices 104 start the post-processing process. Thus the security proof of the GMCS QKD can be applied. Note that the above security analysis covers the cases when the n-1 devices 104 do not execute the protocol honestly.

The performance of a QSS protocol in accordance with one embodiment may be evaluated as discussed herein via numerical simulations based on realistic system parameters. For the numerical simulations, the quantum channel or link 140 is a telecom fiber with an attenuation coefficient of $\gamma$. Numerical simulations may be conducted based on a specific configuration: the fiber length between the trusted device 106 (Bob) and the farthest device 104 (Alice) is L. All the other n−1 devices 104 are distributed between them with equal separation. According to step 10 in the protocol described herein, the secure key rate of the QSS protocol is the smallest secure key rate of two-party QKD evaluated between the trusted device 106 and each device 104. Given that each device 104 introduces the same amount of excess noise (defined as $\varepsilon_0$ in the shot-noise limit), the smallest QKD key rate under normal operation may be identified as the one between Alice and Bob. This is the key rate evaluated herein. It is noted that to implement the QSS protocol in practice the trusted device 106 may evaluate a secure key rate with each device 104 using experimental data, and choose the smallest one as the secure key rate for QSS.

The asymptotic secure key rate of two-party GMCS QKD, in the case of reverse reconciliation:

$$R = fI_{AB} - \chi_{BE},\qquad(1)$$

where $I_{AB}$ is the Shannon mutual information between Alice and Bob; f is the efficiency of the reconciliation algorithm; $\chi_{BE}$ is the Holevo bound between Eve (including external eavesdroppers and the other n−1 devices 104) and Bob. $I_{AB}$ and $\chi_{BE}$ can be determined from the channel loss, observed noises, and other QKD system parameters. Note that all the noise terms in for this numerical analysis are defined in shot-noise units.

The channel transmittance of the kth device 104 is given by $$T_k = 10^{\frac{-\gamma l_k}{10}},\qquad(2)$$

where $$l_k = \frac{n-k+1}{n}L$$

is the fiber length between the trusted device 106 and the kth device 104. In this example, to avoid compromising the practicability, the transmittance of the beam splitter at each device's 104 station is $t_B \cong 1$.

The excess noise contributed by the kth device 104, when referred to the channel input, is given by $$\varepsilon_k = \frac{T_k}{T_1}\varepsilon_0.\qquad(3)$$

The excess noise may be defined as the additional noise above the vacuum noise associated with nonunity channel transmittance. Under normal operation with no eavesdroppers in the channel, the excess noise is mainly due to system imperfections, such as detector noise, errors in quantum state preparation, background light, etc. In (3), $\varepsilon_0$ is defined as the variance of the excess noise from each device 104. Since the secure key rate given below is estimated using noises referred to the channel input (at Alice), the excess noise is calculated from the kth device 104 by dividing $\varepsilon_0$ by the transmittance from Alice to the kth device 104

$$\frac{T_1}{T_k}.$$

In the case of conjugate homodyne detection, the noise added by Bob's detector (referred to Bob's input) is given by:

$$\chi_{het} = [1+(1-\eta_D)+2\upsilon_{e1}]/\eta_D,\qquad(4)$$

where $\eta_D$ and $\upsilon_{e1}$ the efficiency and noise variance of Bob's detector.

The channel-added noise referred to the channel input is given by:

$$\chi_{line} = \frac{1}{T_1} - 1 + \sum_{k=1}^{n}\varepsilon_k.\qquad(5)$$

where the term $$\frac{1}{T_1} - 1$$

represents vacuum noise due to the channel loss.

The overall noise referred to the channel input is given by:

$$\chi_{tot} = \chi_{line} + \frac{\chi_{het}}{T_1}.\qquad(6)$$

Since both quadratures can be used to generate the secure key, the mutual information between Alice and Bob is given by:

$$I_{AB} = \log_2\frac{V+\chi_{tot}}{1+\chi_{tot}}\qquad(7)$$

where $V = V_A + 1$, and $V_A$ is Alice's modulation variance.

To estimate $\chi_{BE}$, the realistic noise model may be adopted where loss and noise of Bob's detector are assumed to be trusted and cannot be accessed by the eavesdropper. Under this model, $\chi_{BE}$ is given by:

$$\chi_{BE} = \sum_{i=1}^{2}G\left(\frac{\lambda_i-1}{2}\right) - \sum_{i=3}^{5}G\left(\frac{\lambda_i-1}{2}\right).\qquad(8)$$

where $G(x) = (x+1)\log_2(x+1) - x\log_2 x$:

$$\lambda_{1,2}^2 = \tfrac{1}{2}[A \pm \sqrt{A^2 - 4B}],\qquad(9)$$

where $$A = V^2(1-2T_1) + 2T_1 + T_1^2(V+\chi_{line})^2,\qquad(10)$$

$$B = T_1^2(V\chi_{line}b+1)^2,\qquad(11)$$

$$\lambda_{3,4}{}^2 = \frac{1}{2}[C \pm \sqrt{C^2 - 4D}], \quad (12)$$

where $$C = \frac{1}{[T_1(V + \chi_{tot})]^2} \\ [A\chi_{het}^2 + B + 1 + 2\chi_{het} \times [V\sqrt{B} + T_1(V + \chi_{line})] + 2T_1(V^2 - 1)]. \quad (13)$$

$$D = \left( \frac{V + \sqrt{B}\,\chi_{het}}{T_t(V - \chi_{tot})} \right)^2, \quad (14)$$

$$\lambda_5 = 1. \quad (15)$$

Simulation parameters can be summarized as follows: $\gamma=0.2$ dB/km, $\varepsilon_0=0.01$, $\upsilon_{e1}=0.1$, $\eta_D=0.5$, and $f=0.95$.

The modulation variance $V_A$ may be numerically optimized at different fiber lengths. In (1), when $V_A$ increases, both the mutual information $I_{AB}$ and Eve's information $\chi_{BE}$ will increase. In the ideal case (no excess noise and the efficiency of the reconciliation algorithm $f=1$), a larger modulation variance $V_A$ always leads to a higher secure key rate, so the optimal value of $V_A$ would be infinite. Taking into account system imperfections and nonunity reconciliation efficiency, $\chi_{BE}$ can increase faster than $fI_{AB}$ when $V_A$ is above a certain value. This can lead to a finite optimal modulation variance. A numerical search may be conducted for the optimal value of $V_A$. For simplicity, it may be assumed all the devices 104 use the same $V_A$. The secure key rate may be further improved by optimizing the modulation variance for each device 104, separately.

Figures 5, 6:
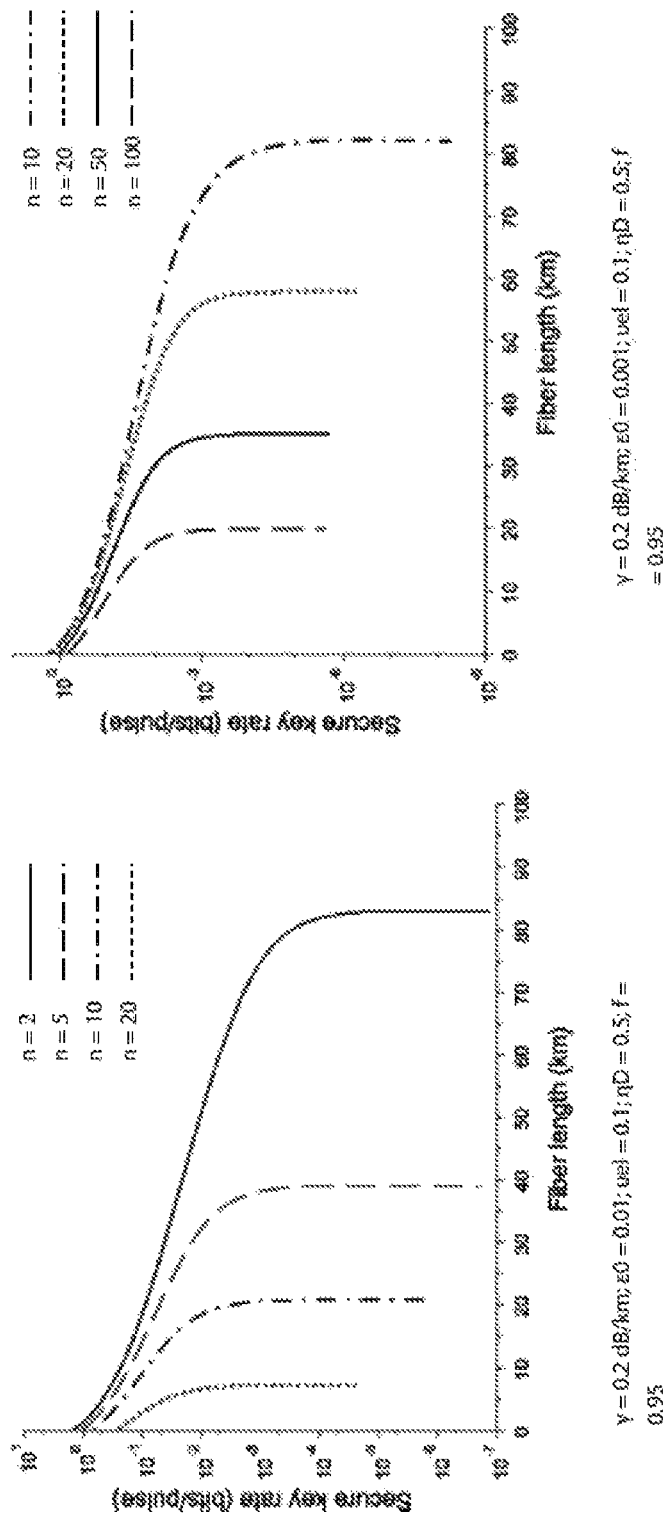
FIGS. 5, 6, and 7 depict the relationship between a secure key rate and various characteristics of the system for quantum secret sharing used to determine the secure key rate.
Figure 7:
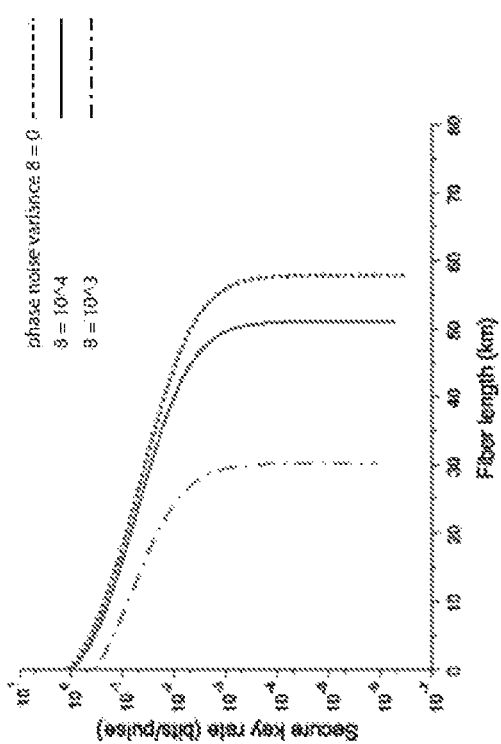

In the graph of FIG. 5, the relations of the secure key rate and the fiber length at different numbers of devices 104 n=2, 5, 10, and 20 is presented. As shown in FIG. 5, the QSS protocol may be conducted over tens of kilometers of telecom fiber with a moderate number of devices 104. The performance can be further enhanced by reducing the excess noise contributed by each device 104.

In the graph of FIG. 6, the simulation results are provided when $\varepsilon_0=0.001$ and n=10, 20, 50, and 100: the QSS protocol can be conducted over 20 km with 100 devices 104.

Comparing with the single qubit sequential QSS scheme, the CV-QSS protocol in accordance with one embodiment resilient to Trojan horse attacks: the encoding modulators within the secure stations cannot be reached by the probing signals from external devices 104 or the eavesdropper. Furthermore, by using highly asymmetric beam splitters, the additional loss introduced by each device 104 can be extremely small. This may allow large-scale implementations.

In the numerical analysis, there is an implicit assumption that all the participants share a phase reference. This allows them to prepare quantum states and perform homodyne detection in the same reference frame. Establishing such a phase reference in practice can be done in a variety of ways. One embodiment includes a pilot-aided phase recovery scheme described in CV-QKD, as discussed in U.S. Pat. No. 9,768,885, entitled "PILOT-AIDED FEEDFORWARD DATA RECOVERY IN OPTICAL COHERENT COMMUNICATIONS", published Sep. 19, 2017, and incorporated herein by reference. For instance, the first device 104 may generate a classical phase reference pulse using the same laser for quantum state generation. After applying a suitable multiplexing scheme (time, frequency, polarization, or a combination of them), the phase reference pulse may propagate through the same optical path as the quantum signal.

Each device 104 down the link 140 (and also the trusted device 106) splits out a suitable portion of the phase reference pulse and with it interferes the local laser. This allows each device 104 (and the trusted device 106) to determine the phase difference φk between the local phase frame and that of the first device 104. After the quantum transmission stage, the n−1 devices 104 and the trusted device 106 may first correct the raw data by performing rotation $x'_k = x_k \cos \varphi_k - p^k \sin \varphi_k$, $p_k = x_k \sin \varphi_k + p_k \cos \varphi_k$; then they may proceed with the remaining steps of the QSS protocol in accordance with one embodiment described herein.

The graph of FIG. 6 depicts secure key rates in the presence of phase noise for n=20, with simulation results of the secure key rate for phase noise variance $\delta=0$ (dot), $\delta=10^{-4}$ (solid), and $\delta=10^{-3}$ (dash dot). The simulation parameters are as follows: $\gamma=0.2$ dB/km; $\varepsilon_0=0.001+V_A\delta$; $\upsilon_{e1}=0.1$; $\eta_D=0.5$; $f=0.95$. In practice, the above phase recovery scheme may not be implemented perfectly due to system imperfections. The additional excess noise contributed by each device 104 can be described by $\varepsilon_p = V_A \delta$, where $\delta$ is the phase noise variance (in units of rad$^2$) at each device 104. This additional noise may be added into $\varepsilon_0$ in (3). A phase noise of $10^{-3}$ has been demonstrated experimentally. A phase noise of $10^{-4}$ is considered achievable by further improving the system 100. FIG. 5 shows the simulation results for the case of n=20 devices 104 at three different phase noise levels: $\delta=0$, $10^{-4}$, and $10^{-3}$. Even in the case of $\delta=10^{-3}$, it is shown that a reasonable performance is provided.

The CV QSS protocol described herein is based on the GMCS QKD, which requires each player to generate Gaussian distributed random numbers and to actively modulate the output of a local laser using phase and amplitude modulators. An alternative passive scheme based on a thermal source has been described elsewhere to simplify the state preparation process in CV-QKD, e.g., in U.S. Nonprovisional application Ser. No. 16/197,457, entitled "QUANTUM KEY DISTRIBUTION USING A THERMAL SOURCE", filed Nov. 21, 2018, and incorporated herein by reference. Such a scheme can also be applied in the CV-QSS protocol described herein. In this case, at each player's station, the phase and amplitude measurements can be carried out with high precision on the portion of the state that is transmitted through the asymmetric beam splitter, rather than on the weaker portion coupled into the quantum channel.

The trusted device 106 in one embodiment may include a detector 107 operable to perform homodyne detection. This arrangement may enable application of a security proof, such as a security proof described in CV-QKD as discussed in U.S. Nonprovisional application Ser. No. 16/197,457, entitled "QUANTUM KEY DISTRIBUTION USING A THERMAL SOURCE", filed Nov. 21, 2018, and incorporated herein by reference, employing the trusted detector noise model.

In one embodiment, the system 100 may be configured such that any one of the devices 104 may be configured as the trusted device 106. In one embodiment, each device 104 may include both a source and detector. The one chosen as the trusted device 106 may perform measurement while the others prepare quantum states. In this embodiment, modifications in the quantum transmission stage may be implemented accordingly, and network rerouting may be provided. Additionally, or alternatively, one of the devices 104 may be configured as the trusted device 106 changing the post-processing procedures. For instance, after the quantum stage, device 104-P2 in FIG. 2A may decide to be the trusted device 104, device 104-P2 may carry out the remaining steps of the QSS protocol in accordance with one embodiment, with help from the other participants. More specifically, device 104-P2 may estimate the potential QKD key rate with each other device 104 under the assumption that all the other devices 104 are dishonest. There are cases when the two trusted QKD parties prepared quantum states while the measurement was conducted by a dishonest player, a scenario similar to the measurement-device-independent (MDI) QKD. In these cases, the security proof and key rate formulas developed in CV MDI-QKD may be applied directly. Schemes of CV MDI-QKD may involve a highly efficient homodyne detector and are more sensitive to channel losses.

A CV-QSS protocol in accordance with one embodiment may be based on practical laser sources and homodyne detectors, which is intrinsically resilient to Trojan horse attacks. By implementing CV-QSS, enhanced security against both eavesdroppers and dishonest players in the presence of high channel loss can be provided.

Figure 3:
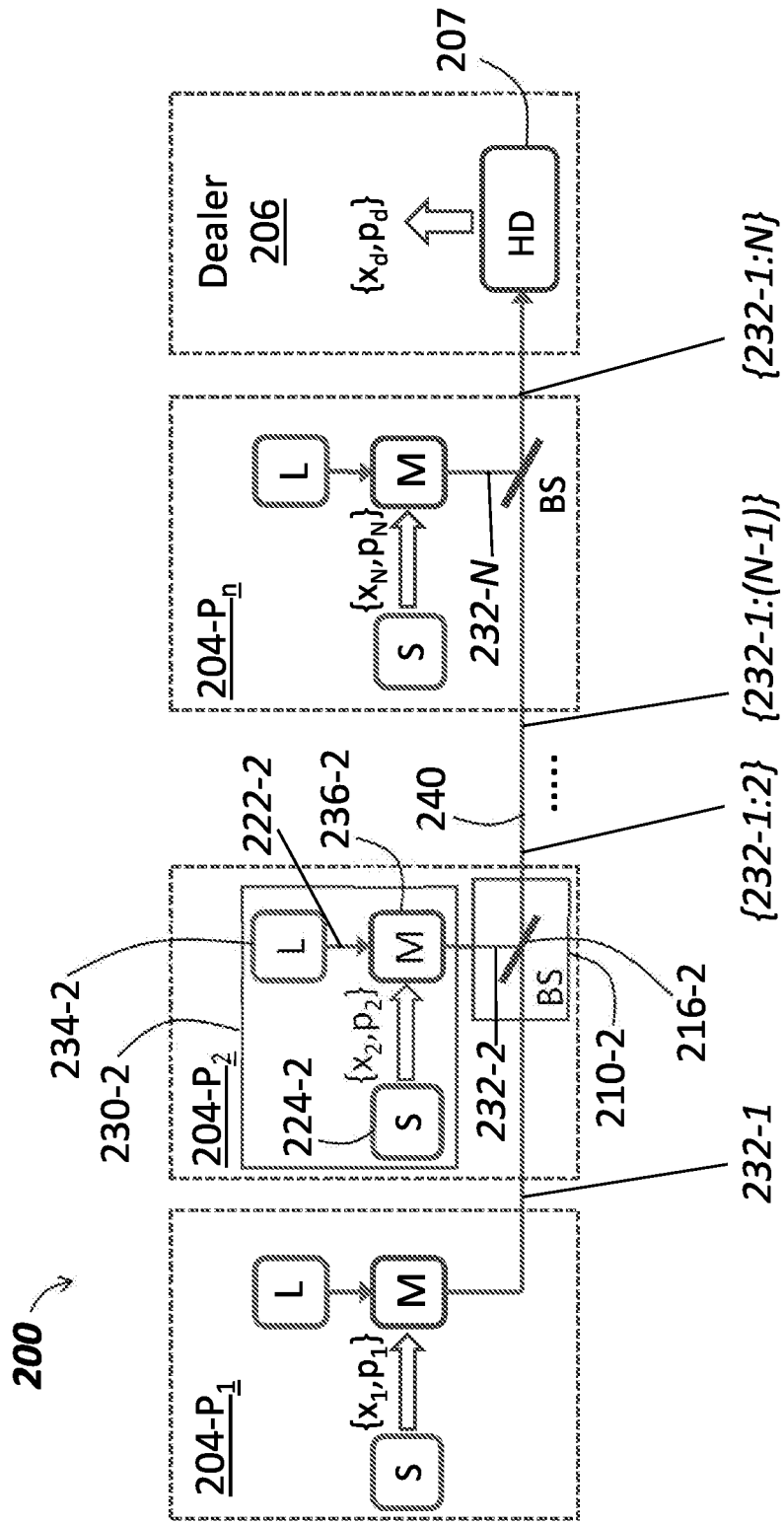
FIG. 3 illustrates a system for quantum secret sharing in accordance with another embodiment.

A system in accordance with another embodiment of the present disclosure is shown in FIG. 3, and generally designated 200. The system 200 is similar to the system 100 in many respects, including one or more of the following: an optical link 240, a trusted device 206, a first device 204-P1 coupled with the trusted device 206 through the optical link 240, and a plurality of intermediary devices including a second device 204-P2, . . . , and an $N^{th}$ device 204-PN. The first device 204-P1, similar to the first device 104-P1, is configured to form a first quantum signal 232-1, and launch it down the optical link 240 to the trusted device 206. Each intermediary device 204-Pj includes a combiner 210-j operable to coherently combine a locally-formed quantum signal 232-j with an incoming coherent combination of upstream-formed quantum signals $\{232\text{-}1:(j-1)\}$ to yield an outgoing coherent combination of quantum signals $\{232\text{-}1:j)\}$, where $2 \leq j \leq N$. Here, each intermediary device 204-Pj is configured to form a respective quantum signal 232-j, and launch its quantum signal 232-j down the optical link 240 to the trusted device 206 coherently with the quantum signals $\{232\text{-}1:(j-1)\}$ launched down the optical link 240 by the first device 204-P1 and the intermediary devices 204-P2, . . . , 204-P(j−1) disposed upstream from the intermediary device 204-Pj.

In the illustrated embodiment, each device 204-Pj includes a respective quantum-signal source 230-j, where $1 \leq j \leq N$. Each quantum-signal source 230-j is configured to produce a respective quantum signal 232-j, which in turn carries an associated random signal S-j. In the example illustrated in FIG. 3, each quantum-signal source 230-j includes a respective laser source 234-j configured to emit pulsed-laser light 222-j. In some implementations, the laser module 234-j includes a solid-state laser with an emission spectrum in one of the O-band, the C-band, the L-band, the S-band, or the E-band. Further, each quantum-signal source 230-j includes a respective signal generator 224-j configured to generate the respective random signal S-j. In some implementations, the signal generator 224-j is configured to generate the random signal S-j in accordance with a random-number distribution having a zero-mean Gaussian envelope. Furthermore, each quantum-signal source 230-j includes a respective modulator 236-j, which is operable to modulate the pulsed-laser light 222-j in accordance with the random signal S-j, e.g., as determined by random numbers S-j=$\{X_j, P_j\}$, as shown in the illustrated embodiment. Also, each quantum-signal source 230-j includes a respective attenuator (not specifically shown in FIG. 3). The attenuator is configured to reduce the power of the modulated pulsed-laser light to form the quantum signal 232-j. As an example, the random sources 230-1, . . . , 230-N may be configured to form random quantum states using random numbers generated from a quantum random number generator as described in U.S. Pat. No. 10,585,645, entitled QUANTUM RANDOM NUMBER GENERATOR, to Qi, issued Mar. 10, 2020—the disclosures of which are hereby incorporated by reference in their entireties. Additionally, the signal generator 224-j of each device 204-Pj is operable to locally store, prior to launching, by the device 204-Pj, the locally formed quantum signal 232-j down the optical link 240 to the trusted device 206, a copy of the random signal S-j that rides on the quantum signal 232-j.

Each combiner 210-j in the illustrated embodiment includes a beam splitter 216-j, e.g., a beam splitter with high transmission. In some implementations, a transmissivity to reflectivity ratio of the asymmetric beam splitter 216-j can be in the range of 50%-99% to 50%-1%, for instance.

The trusted device 206 is operable to receive the coherent combination of the quantum signals $\{232\text{-}1:N\}$ launched down the optical link 240 by the upstream of devices 204-P1, . . . , 204-PN. The trusted device 206 includes a detector 207 operable to detect a combined random signal S-D indicative of the random signals S-1, . . . , S-N, as described above in connection with FIGS. 2A-2B. The detector 207 may be a single homodyne detector, e.g., operable to measure a randomly chosen quadrature of the incoming coherent combination of the quantum signals $\{232\text{-}1:N\}$. Alternatively, the detector 207 may include a double homodyne detector, e.g., operable to simultaneously measure two conjugate quadratures of the incoming coherent combination of the quantum signals $\{232\text{-}1:N\}$. Also, the trusted device 206 is configured to establish a secure key K, e.g., in accordance with operations 160-171 of method 150, based on (i) the detected combined random signal S-D, and (ii) portions of the random signals S-j stored, and shared with the trusted device 206, by the upstream devices 204-P1, . . . , 204-PN.

The devices 204-P1, . . . , 204-PN are cooperative such that they work together to yield a secure key, in accordance with block 180 of method 150, based on (i) decoding information received by each device 204-Pj from the trusted device 206, (ii) portions of its own stored random signal S-j, and (iii) portions of random signals S-k≠j stored by, and shared with, the other devices 204-Pk≠j, where $1 \leq j, k \leq N$. The secure key determined by the devices 204-Pj corresponds to the secure key K established by the trusted device 206 in accordance with operations 160-171 of method 150.

It should be understood that one or more aspects of the system 200 may be incorporated into the system 100 or alternative systems described herein. Likewise, one or more aspects of the system 100 or alternative systems described herein may be incorporated into the system 200. It is also to be understood that one or more aspects of the system 200 may be absent from the system 200 to yield a system operable to perform, e.g., in accordance with method 150, a QSS protocol that includes a quantum stage and a classical post-processing stage.

Figure 4:
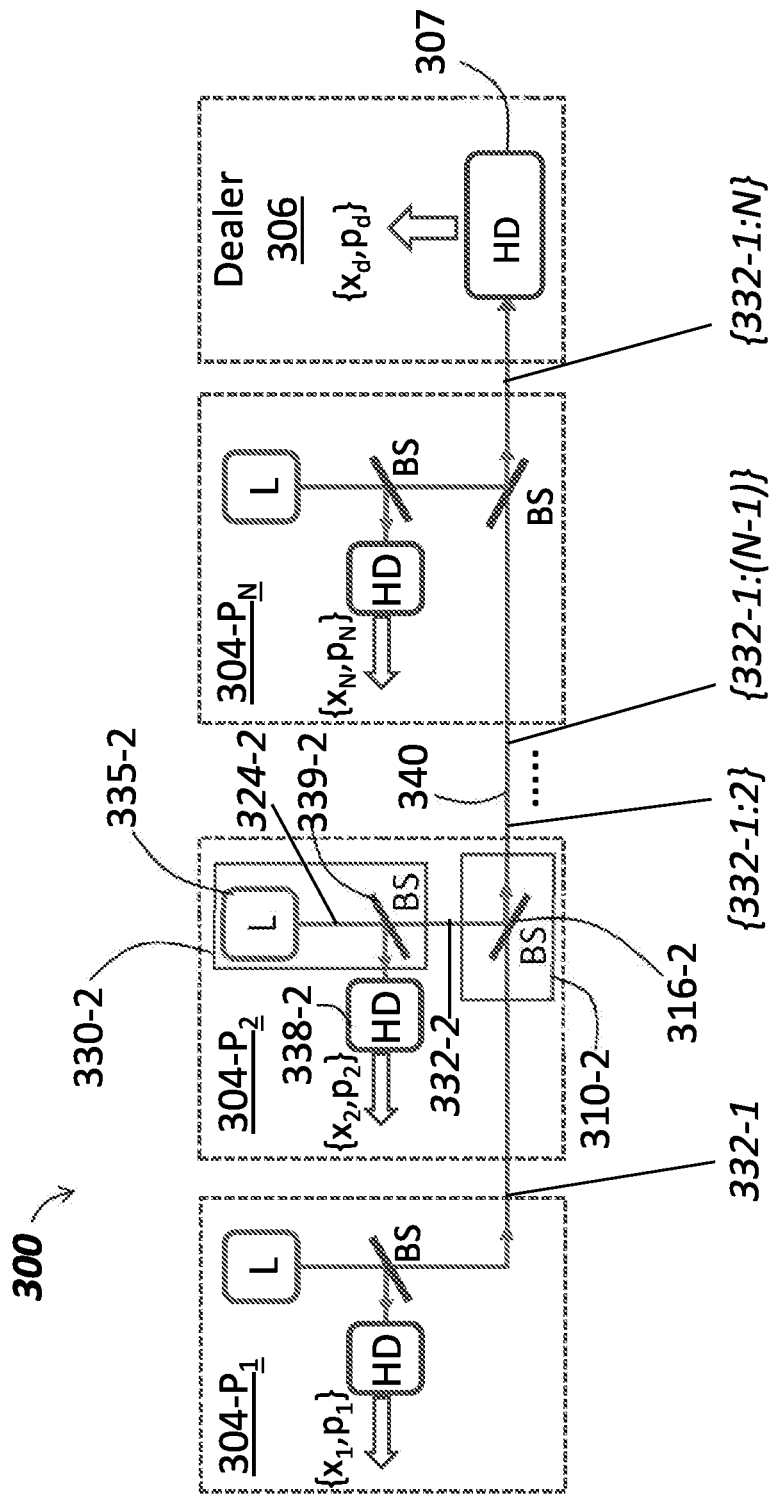
FIG. 4 illustrates a system for quantum secret sharing in accordance with yet another embodiment.

A system in accordance with yet another embodiment of the present disclosure is shown in FIG. 4, and generally designated 300. The system 300 is similar to the system 100 in many respects, including one or more of the following: an optical link 340, a trusted device 306, a first device 304-P1 coupled with the trusted device 306 through the optical link 340, and a plurality of intermediary devices including a second device 304-P2, . . . , and an $N^{th}$ device 304-PN. The first device 304-P1, similar to the first device 104-P1, is configured to form a first quantum signal 332-1, and launch it down the optical link 340 to the trusted device 306. Each intermediary device 304-Pj includes a combiner 310-j operable to coherently combine a locally-formed quantum signal 332-j with an incoming coherent combination of upstream-formed quantum signals {332-1:(j−1)} to yield an outgoing an outgoing coherent combination of quantum signals {332-1:j}, where 2≤j≤N. Moreover, each intermediary device 304-Pj is configured to form a respective quantum signal 332-j, and launch its quantum signal 332-j down the optical link 340 to the trusted device 306 coherently with the quantum signals {332-1:(j−1)} launched down the optical link 340 by the first device 304-P1 and the intermediary devices 304-P2, . . . , 304-P(j−1) disposed upstream from the intermediary device 304-Pj.

In the embodiment illustrated in FIG. 4, each device 304-Pj includes, in addition to the respective combiner 310-j, a respective transducer 338-j, and a respective quantum-signal source 330-j, where 1≤j≤N. Each quantum-signal source 330-j is configured to produce a respective quantum signal 332-j, which in turn carries an associated random signal S-j. Here, each quantum-signal source 330-j includes a respective thermal source 335-j configured to emit a random optical signal 324-j. In some implementations, the thermal source 335-j includes a broadband super-luminescent diode (SLD.) Further, each quantum-signal source 230-j includes a respective source beam splitter 339-j configured to transmit a fraction of the random optical signal 324-j as the quantum signal 332-j, and reflect the remaining random optical signal 324-j to the transducer 338-j. The transducer 338-j is configured to convert the reflected portion of the random optical signal 324-j to the random signal S-j. In some implementations, the transducer 338-j includes a double homodyne detector to produce a pair of random number signals {Xi, Pi}. Here, signal Xi represents measurements of the modulation of the amplitude of the random optical signal 324-j, and signal Pi represents measurements of the phase of the random optical signal 324-j. As an example, the quantum-signal source 330-j may include a noisy light source 335-j and a source beam splitter 339-j configured as described in U.S. Pat. No. 10,585,645, entitled QUANTUM RANDOM NUMBER GENERATOR, to Qi, issued Mar. 10, 2020 and U.S. Nonprovisional application Ser. No. 16/197,457, entitled QUANTUM KEY DISTRIBUTION USING A THERMAL SOURCE, filed Nov. 21, 2018—the disclosures of which are hereby incorporated by reference in their entireties.

Each combiner 310-j in the illustrated embodiment may include a respective beam splitter 316-j, e.g., a beam splitter with high transmission implemented as the asymmetric beam splitter 216. In one embodiment, the combiner beam splitter 316-j and the source beam splitter 339-j may be replaced with a single beam splitter operable to provide the functionality described in conjunction with both the combiner beam splitter 316-j and the source beam splitter 339-j.

The trusted device 306 is operable to receive coherent combination of the quantum signals {332-1:N}. The trusted device 306 includes a detector 307 operable to detect a combined random signal S-D indicative of the random signals S-1, . . . , S-N, as described above in connection with FIGS. 2A-2B. The detector 307 may be a single homodyne detector, e.g., operable to measure a randomly chosen quadrature of the incoming coherent combination of the quantum signals {332-1:N}. Alternatively, the detector 307 may be a double homodyne detector, e.g., operable to simultaneously measure two conjugate quadratures of the incoming coherent combination of the quantum signals {332-1:N}. Also, the trusted device 306 is configured to establish a secure key K, e.g., in accordance with operations 160-171 of method 150, based on (i) the detected combined random signal S-D, and (ii) portions of the random signals S-j stored, and shared with the trusted device 306, by the upstream devices 304-P1, . . . , 304-PN.

The devices 304-P1, . . . , 304-PN are cooperative such that the they work together to yield a secure key, in accordance with block 180 of method 150, based on (i) decoding information received by each device 304-Pj from the trusted device 306, (ii) portions of its own stored random signal S-j, and (iii) portions of random signals S-k≠j stored by, and shared with, the other devices 304-Pk≠j, where 1≤j,k≤N. The secure key determined by the devices 304-Pj corresponds to the secure key K established by the trusted device 306 in accordance with operations 160-171 of method 150.

It should be understood that one or more aspects of the system 300 may be incorporated into the system 100 or alternative systems described herein. Likewise, one or more aspects of the system 100 or alternative systems described herein may be incorporated into the system 300. It is also to be understood that one or more aspects of the system 300 may be absent from the system 300 to yield a system operable to perform, e.g., in accordance with method 150, a QSS protocol that includes a quantum stage and a classical post-processing stage.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows.

The invention claimed is:

1. A system for quantum secret sharing, the system comprising:
   an optical link;
   a trusted device;
   a first device coupled with the trusted device through the optical link, the first device configured to
      form a first quantum signal that carries a first random signal, and
      launch the first quantum signal down the optical link to the trusted device;
   one or more intermediary devices distributed along the optical link between the first device and the trusted device, each intermediary device configured to
      form a respective quantum signal that carries an associated random signal, and
      launch its quantum signal down the optical link to the trusted device coherently with the quantum signals launched down the optical link by the first device and the intermediary devices disposed upstream from the intermediary device;
   wherein the trusted device is configured to
      receive a coherent combination of the quantum signals from the upstream devices and detect a combined random signal indicative of the random signals carried on the received quantum signals,
      for each upstream device, determine a respective key rate associated with the upstream device based on
         a randomly selected portion of the random signal obtained from the upstream device via authenticated communication,
         the corresponding portions of the random signals broadcast, by the respective remaining upstream devices, upon request by the trusted device, and
         the corresponding portion of the combined random signal, and
      produce, using reverse reconciliation from the remaining combined random signal, a secure key at a key rate equal to the minimum of the determined key rates, and
      broadcast, to the upstream devices, decoding information to be used by the upstream devices to collaboratively determine the secure key, and a message encoded using the secure key.

2. The system of claim 1, wherein the upstream devices are configured to collaborate with each other to
   determine the secure key by using the broadcast decoding information and by sharing unpublished portions of the random signals, and
   decode the broadcast message using the secure key.

3. The system of claim 1, wherein each intermediary device comprises
   a respective quantum-signal source configured to produce the associated quantum signal,
   a respective combiner disposed in the optical link and configured to
      transmit the quantum signals launched down the optical link by the first device and the intermediary devices disposed upstream from the intermediary device, and
      receive, and redirect along the optical link, the locally produced quantum signal.

4. The system of claim 3, wherein the combiner comprises an asymmetric beam splitter with a transmissivity in a range of 50-99%, and a reflectivity in a range of 50-1%.

5. The system of claim 3, wherein each quantum-signal source comprises
   a laser module configured to emit pulsed-laser light,
   a signal generator configured to generate the respective random signal,
   a modulator configured to modulate the pulsed-laser light in accordance with the random signal, and
   an attenuator configured to reduce the power of the modulated pulsed-laser light to form the quantum signal.

6. The system of claim 5, wherein the laser module comprises a solid-state laser with an emission spectrum in one of the O-band, the C-band, the L-band, the S-band, or the E-band.

7. The system of claim 5, wherein the signal generator is configured to generate the random signal in accordance with a random-number distribution having a zero-mean Gaussian envelope.

8. The system of claim 3, wherein
   each upstream device further comprises a respective transducer, and
   the quantum-signal source comprises
      a thermal source configured to emit a random optical signal, and
      a source beam splitter configured to transmit a fraction of the random optical signal as the quantum signal, and reflect the remaining random optical signal to the transducer,
   wherein the transducer is configured to convert the reflected portion of the random optical signal to the random signal.

9. The system of claim 8, wherein the thermal source comprises a super-luminescent diode.

10. The system of claim 8, wherein the transducer comprises a homodyne detector.

11. The system of claim 3, wherein the trusted device is configured to calibrate transmissions of the combiners by collaborating with the upstream devices.

12. The system of claim 1, wherein the trusted device is configured to determine, for each upstream device, the respective key rate associated with the upstream device using security proof of two-party quantum-key distribution (QKD) between the upstream device and the trusted device.

13. The system of claim 1, wherein the trusted device comprises a homodyne detector.

14. The system of claim 1, wherein the trusted device is configured to, for each upstream device,
   obtain, from the upstream device via authenticated communication, a randomly selected portion of the random signal,
   access the corresponding portions of the random signals broadcast, upon request by the trusted device, by the respective remaining upstream devices, and
   determine a respective key rate associated with the upstream device based on the corresponding portions of the random signals and of the combined random signal.

15. The system of claim 1, wherein each intermediary device is configured to launch its quantum signal down the optical link in the same spatiotemporal mode as the quantum signals launched down the optical link by the first device and the intermediary devices disposed upstream from the intermediary device.

16. The system of claim 1, wherein the optical link comprises one of a fiber optic or free space.

17. The system of claim 1, wherein the one or more intermediary devices distributed along the optical link between the first device and the trusted device comprise up to one hundred intermediary devices.

18. A system for quantum secret sharing, the system comprising:
an optical link;
a trusted device;
a first device coupled with the trusted device through the optical link, the first device configured to:
form a first quantum signal that carries a first random signal, and
inject the first quantum signal into the optical link;
a second device disposed along the optical link between the first device and the trusted device, the second device configured to:
form a second quantum signal that carries a second random signal, and
inject the second quantum signal into the optical link coherently with the first quantum signal;
wherein the trusted device is configured to:
receive a coherent combination of the first and second quantum signals of the first and second devices,
detect a combined random signal indicative of the first and second random signals carried on the first and second quantum signals,
produce a secure key based, at least in part, on the combined random signal,
transmit, to the first and second devices, information to be used by the first and second devices to collaboratively determine the secure key;
wherein the trusted device, for each of the first and second devices, determines first and second key rates associated respectively with the first and second devices;
wherein the first key rate is based on 1) a first randomly selected portion of the first random signal obtained from the first device via authenticated communication, 2) a first key rate corresponding portion of the second random signal broadcast by the second device, and 3) a first key rate corresponding portion of the combined random signal; and
wherein the second key rate is based on 1) a second randomly selected portion of the second random signal obtained from the second device via authenticated communication, 2) a second key rate corresponding portions of the first random signal broadcast by the first device, and 3) a second key rate corresponding portion of the combined random signal.

19. The system of claim 18 wherein the trusted device is configured to produce, using reverse reconciliation from a portion of the combined random signal other than the first and second key rate corresponding portions, the secure key at a key rate equal to a minimum of the determined first and second key rates.

20. A system for quantum secret sharing, the system comprising:
an optical link;
a trusted device;
a first device coupled with the trusted device through the optical link, the first device configured to:
form a first quantum signal that carries a first random signal, and
inject the first quantum signal into the optical link;
a second device disposed along the optical link between the first device and the trusted device, the second device configured to:
form a second quantum signal that carries a second random signal, and
inject the second quantum signal into the optical link coherently with the first quantum signal;
wherein the trusted device is configured to:
receive a coherent combination of the first and second quantum signals of the first and second devices,
detect a combined random signal indicative of the first and second random signals carried on the first and second quantum signals,
produce a secure key based, at least in part, on the combined random signal, and
transmit, to the first and second devices, information to be used by the first and second devices to collaboratively determine the secure key; and
wherein the trusted device is configured to transmit, to the first and second devices, a message encoded using the secure key, and wherein the first and second devices are operable to decode the message using the collaboratively determined secure key.

21. The system of claim 20 wherein first and second devices are configured to determine the secure key by using the information transmitted from the trusted device and by sharing unpublished portions of the random signals.

22. The system of claim 20 wherein the optical link comprises one of a fiber optic or free space.

23. A system for quantum secret sharing, the system comprising:
an optical link;
a trusted device;
a first device coupled with the trusted device through the optical link, the first device configured to:
form a first quantum signal that carries a first random signal, and
inject the first quantum signal into the optical link;
a second device disposed along the optical link between the first device and the trusted device, the second device configured to:
form a second quantum signal that carries a second random signal, and
inject the second quantum signal into the optical link coherently with the first quantum signal;
wherein the trusted device is configured to:
receive a coherent combination of the first and second quantum signals of the first and second devices,
detect a combined random signal indicative of the first and second random signals carried on the first and second quantum signals,
produce a secure key based, at least in part, on the combined random signal,
transmit, to the first and second devices, information to be used by the first and second devices to collaboratively determine the secure key; and
wherein the second device includes a second device combiner optically coupled with the optical link, the second device is operable to obtain a phase reference of the first quantum signal, and use the second device combiner to coherently combine the second quantum signal with the first quantum signal that is incoming down the optical link to yield an outgoing coherent combination of first and second quantum signals based at least on the phase reference.

24. The system of claim 23 comprising a plurality of devices including the first and second devices, and wherein:
each of the plurality of devices is coupled with the trusted device through the optical link;

each of the plurality of devices is configured to:
- form a respective quantum signal,
- access a phase reference that is shared among the plurality of devices, and
- inject, in accordance with the shared phase reference, the locally formed quantum signal into the optical link;

each of the respective quantum signals carries an associated random signal respectively provided by each of the plurality of devices;

the coherent combination received by the trusted device includes the respective quantum signal from each of the plurality of devices; and the combined random signal is indicative of the associated random signal respectively provided by each of the plurality of devices.

* * * * *